(12) United States Patent
Masuyama et al.

(10) Patent No.: US 10,146,704 B2
(45) Date of Patent: Dec. 4, 2018

(54) VOLATILE/NON-VOLATILE MEMORY DEVICE ACCESS PROVISIONING SYSTEM

(71) Applicant: Dell Products L.P., Round Rock, TX (US)

(72) Inventors: Jinsaku Masuyama, Cedar Park, TX (US); Mukund Khatri, Austin, TX (US); Ching-Lung Chao, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 409 days.

(21) Appl. No.: 15/044,871

(22) Filed: Feb. 16, 2016

(65) Prior Publication Data

US 2017/0235682 A1    Aug. 17, 2017

(51) Int. Cl.
*G06F 12/14* (2006.01)
*G06F 3/06* (2006.01)

(52) U.S. Cl.
CPC ........ *G06F 12/1408* (2013.01); *G06F 3/0622* (2013.01); *G06F 3/0658* (2013.01); *G06F 3/0679* (2013.01); *G06F 2212/1052* (2013.01); *G06F 2212/202* (2013.01)

(58) Field of Classification Search
CPC .. G06F 12/1408; G06F 3/0622; G06F 3/0658; G06F 3/0679; G06F 2212/1052; G06F 2212/202
See application file for complete search history.

(56) References Cited

U.S. PATENT DOCUMENTS

| | | | | |
|---|---|---|---|---|
| 5,742,758 | A * | 4/1998 | Dunham | G06F 11/2273 |
| | | | | 714/E11.148 |
| 6,407,949 | B1 * | 6/2002 | Jha | G11C 16/22 |
| | | | | 365/185.11 |
| 6,647,481 | B1 * | 11/2003 | Luu | G06F 3/0601 |
| | | | | 711/165 |
| 2002/0157010 | A1 * | 10/2002 | Dayan | G06F 21/80 |
| | | | | 713/191 |
| 2005/0076208 | A1 * | 4/2005 | Hori | G06F 21/10 |
| | | | | 713/165 |
| 2007/0288683 | A1 * | 12/2007 | Panabaker | G06F 12/06 |
| | | | | 711/101 |
| 2008/0276060 | A1 * | 11/2008 | Bostrom | G06F 12/1458 |
| | | | | 711/164 |

(Continued)

*Primary Examiner* — Ramon A. Mercado
(74) *Attorney, Agent, or Firm* — Haynes and Boone, LLP

(57) ABSTRACT

A volatile/non-volatile memory device access provisioning system includes a processing system and a controller coupled to a memory device. The controller provides an access key to the memory device and causes memory device communications to be passed to the processing system when the access key is available. The controller simply causes memory device communications to be passed to the processing system when the access key is not available. The memory device masks non-volatile memory subsystem access information in the memory device to prevent the processing system from accessing non-volatile memory subsystem(s) in the memory device, and then determines whether the access key has been received from the controller. The memory device will unmask the non-volatile memory subsystem access information such that the processing system can access non-volatile memory subsystem(s) in response to determining that the access key has been received from the controller.

13 Claims, 6 Drawing Sheets

(56) References Cited

U.S. PATENT DOCUMENTS

| | | | | |
|---|---|---|---|---|
| 2012/0131253 A1* | 5/2012 | McKnight | ................. | G06F 1/30 |
| | | | | 710/308 |
| 2013/0339572 A1* | 12/2013 | Fanning | .............. | G06F 12/1009 |
| | | | | 711/102 |
| 2014/0208047 A1* | 7/2014 | Vembu | ................ | G06F 12/0292 |
| | | | | 711/161 |
| 2014/0310451 A1* | 10/2014 | Lee | ....................... | G06F 3/0605 |
| | | | | 711/105 |
| 2015/0074339 A1* | 3/2015 | Cheriton | ............ | G06F 12/0804 |
| | | | | 711/103 |
| 2015/0347151 A1* | 12/2015 | Takefman | ............. | G06F 9/4406 |
| | | | | 713/2 |
| 2016/0188456 A1* | 6/2016 | Blagodurov | ........ | G06F 12/0246 |
| | | | | 711/103 |
| 2016/0371187 A1* | 12/2016 | Roberts | ............... | G06F 12/0862 |

\* cited by examiner

VOLATILE/NON-VOLATILE MEMORY DEVICE ACCESS PROVISIONING SYSTEM

BACKGROUND

The present disclosure relates generally to information handling systems, and more particularly to a system for provisioning access to a volatile/non-volatile memory device in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, servers, typically utilize memory devices such as, for example, Dual Inline Memory Modules (DIMMs), that provide for the storage of instructions and/or other data for execution by a processing system to provide a variety of desired functionality of the server. Traditionally, DIMMs have utilized volatile Dynamic Random Access Memory (DRAM) that temporarily stores the instructions and/or other data until power is removed from the DIMM, which causes the loss of the instructions and/or data on the DIMM. However, recently Non-Volatile DIMMs (NVDIMMs) have been introduced that retain instructions and/or data stored thereon even when power is removed from the NVDIMM. Such NVDIMMs typically include flash memory along with the DRAM, as well as access to a battery or capacitor that allows for the copying of instructions and/or data from the DRAM to the flash memory when external power is removed from the NVDIMM. However, the use of NVDIMM raises several issues. For example, the persistence of instructions and/or data on the flash memory (which has conventionally been stored in the volatile DRAM) compromises the security of those instructions and/or data due to the ability to remove the NVDIMM from the server without erasing those instructions and/or data, which enables theft of the instructions and/or data. Furthermore, the ability to store instructions and/or data persistently on NVDIMMs can compromise the security of the server, as it enables the ability to introduce unauthorized instructions and/or data (e.g., malicious instructions such as malware) via an unauthorized NVDIMM added to the server.

Accordingly, it would be desirable to provide an improved NVDIMM system.

SUMMARY

According to one embodiment, a volatile/non-volatile memory device includes at least one volatile memory subsystem; at least one non-volatile memory subsystem; a storage subsystem that stores volatile memory subsystem access information and non-volatile memory subsystem access information; a system connector; and a control unit that is coupled to the at least one volatile memory subsystem, the at least one non-volatile memory subsystem, the storage system, and the system connector, wherein the control unit is configured to: mask the non-volatile memory subsystem access information to prevent a system that is coupled to the system connector from accessing the at least one non-volatile memory subsystem, wherein the volatile memory subsystem access information allows the system to access the at least one volatile memory subsystem; determine whether a valid access key has been received from the system; and unmask the non-volatile memory subsystem access information such that the system can access the at least one non-volatile memory subsystem in response to determining that the valid access key has been received from the system.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
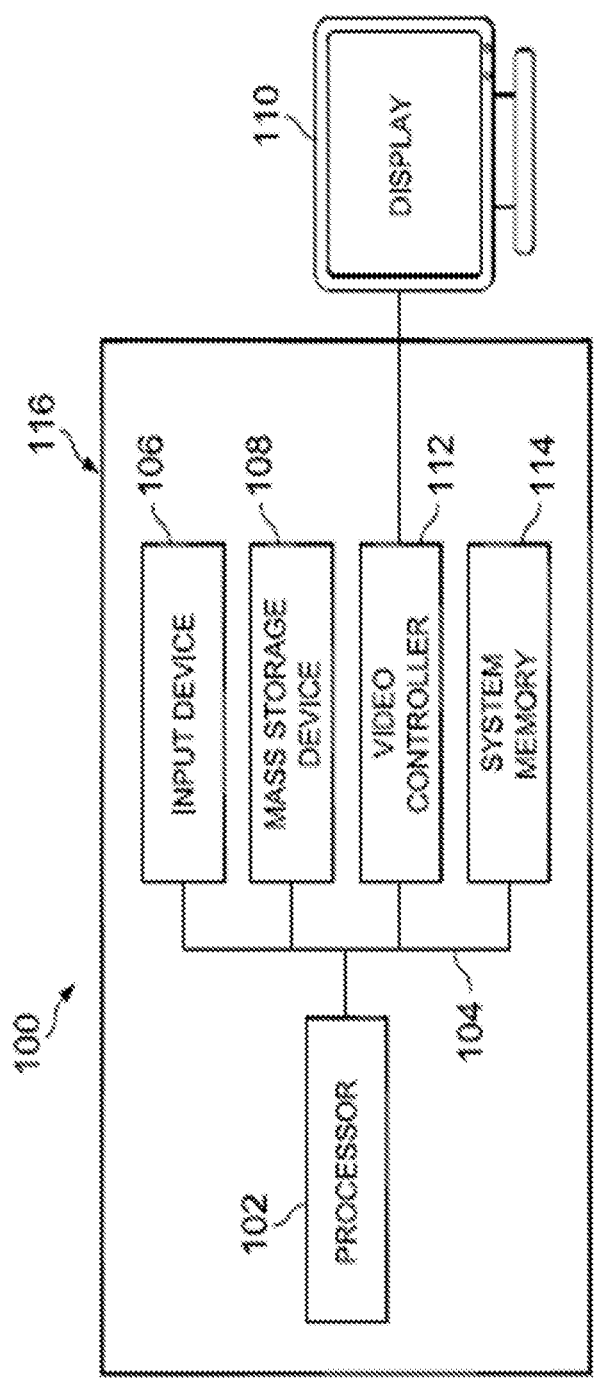
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
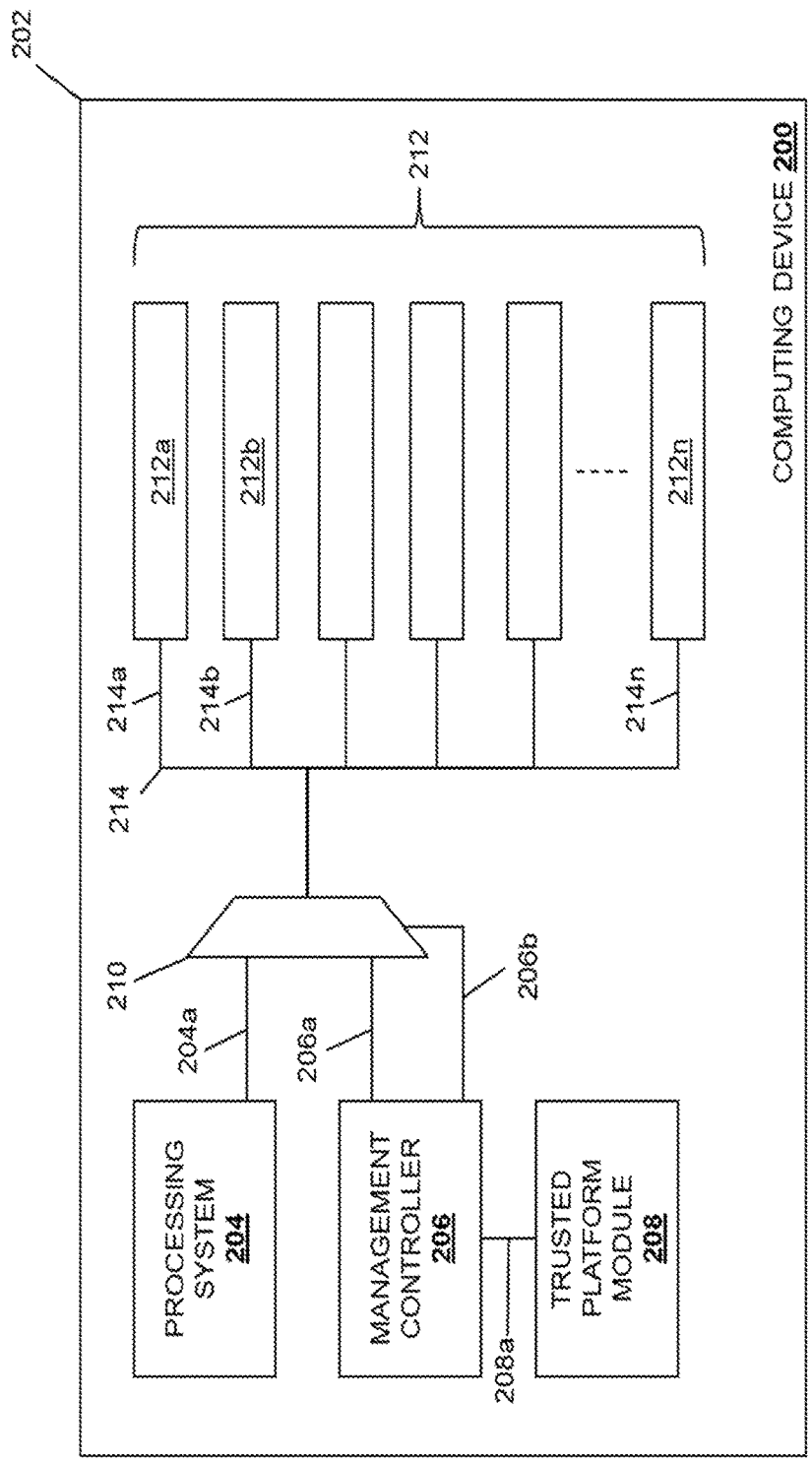
FIG. 2 is a schematic of a computing device that may be used to implement a volatile/non-volatile memory device access provisioning system.

Referring now to FIG. 2, an embodiment of a computing device 200 is illustrated that may be utilized to implement the volatile/non-volatile memory device access provisioning system of the present disclosure. In an embodiment, the computing device 200 may be the IHS 100 discussed above with reference to FIG. 1, and/or may include some or all of the components of the IHS 100. For example, the computing device 200 is discussed below as providing a server that utilizes the volatile/non-volatile memory device access provisioning system of the present disclosure. However, other computing devices including storage systems, networking systems, desktop computing systems, laptop/notebook computing systems, and/or other computing systems known in the art will benefit from the teachings of the present disclosure and thus will fall within its scope. In the illustrated embodiment, the computing device 200 includes a chassis 202 that houses the components of the computing device, only some of which are illustrated in FIG. 2. For example, the chassis 202 houses a processing system 204 that may include one or more of the processors 102 discussed above with reference to FIG. 2. In specific embodiments, the processing system may provide a central processing unit (CPU) of a host that may be coupled to a Basic Input/Output System (BIOS), not illustrated, and configured to execute memory reference code (MRC) from the BIOS in order to, for example, initialized a memory system (discussed in further detail below), determine the details of reading and writing to the memory system, adjust memory system timing algorithms, and/or perform a variety of other MRC-related operations known in the art.

The chassis 202 also houses a controller that, in the embodiments illustrated and described herein, is provided by a management controller 206 such as a Baseboard Management Controller (BMC) provided in a motherboard of a server to interface between system management software and platform hardware. In the illustrated embodiment, a Trusted Platform Module (TPM) 208 is housed in the chassis 202 and coupled to the management controller 206 via an Inter-Integrated Circuit (I$^2$C) link 208a. In an embodiment, the Trusted Platform Module 208 includes a secure cryptoprocessor that is configured to secure hardware in the computing device 200 by integrating cryptographic keys into the computing device 200. Each of the processing system 204 and the management controller 206 is coupled to a multiplexer 210 by respective I$^2$C links 204a and 206a. In addition, the management controller 206 is coupled to the multiplexer 210 by a control link 206b. The multiplexer 210 is coupled to a memory system 212 by an I$^2$C bus 214 that includes a plurality of I$^2$C links 214a, 214b, and up to 214n to a plurality of respective memory device connectors 212a, 212b, and up to 212n provided in the memory system 212. While a specific embodiment of a computing system 200 has been illustrated and described that focuses on specific examples of components that may be utilized in the volatile/non-volatile memory device access provisioning system of the present disclosure, one of skill in the art in possession of the present disclosure will recognize that the illustrated components may be modified or changed while still providing similar functionality, and other components may be added to the computing device to perform other functions of the computing device 200 while remaining within the scope of the present disclosure.

Figure 3:
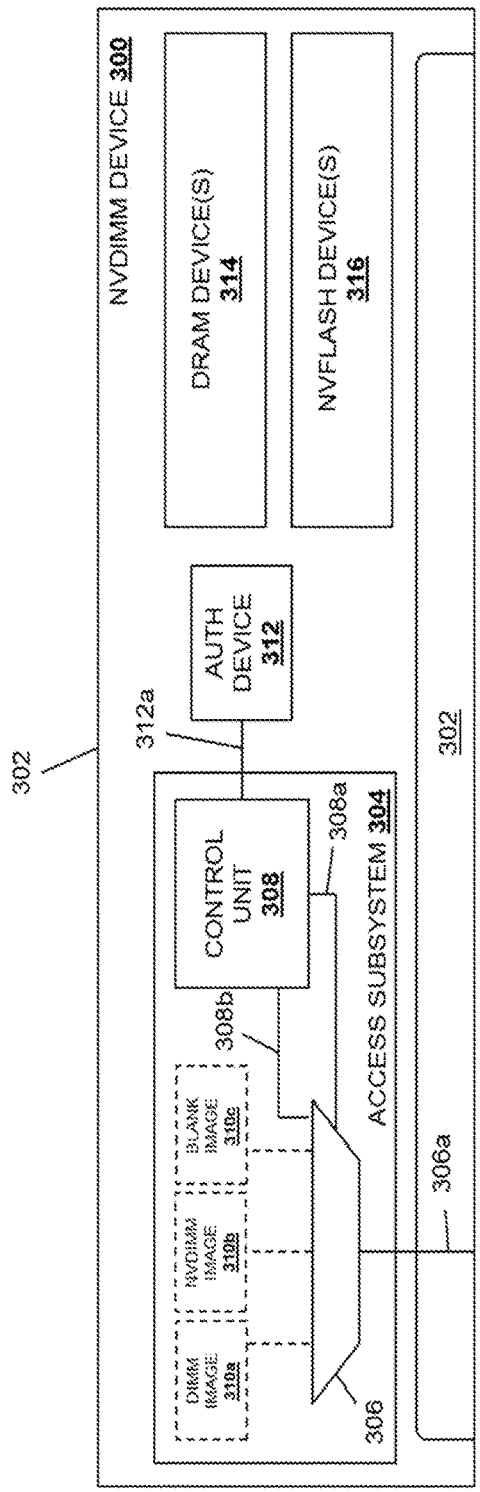
FIG. 3 is a schematic view illustrating an embodiment of a volatile/non-volatile memory device.

Referring now to FIG. 3, an embodiment of a volatile/non-volatile memory device is illustrated that is provided by a Non-Volatile Dual Inline Memory Module (NVDIMM) device 300. The NVDIMM device 300 includes a chassis 302 that supports the components of the NVDIMM device 300, only some of which are illustrated in FIG. 3, and that may be provided by a circuit board and/or other memory device chassis components known in the art. For example, a system connector 304 is provided along an edge of the chassis 302 and configured to couple to a memory device connector such as, for example, the memory device connectors 214a-n discussed above with reference to FIG. 2. An access subsystem 304 is provided on the chassis 302 and, in some embodiments, may be part of a Serial Presence Detect (SPD) subsystem that is configured to provide SPD access information to the computing system 200 as discussed below. A multiplexer 306 is included in the access subsystem 304 and includes an I$^2$C link 306a that is coupled to the system connector 302. A control unit 308 is included in the access subsystem 304 and, in some embodiments, may be provided by a microcontroller (MCU) on the NVDIMM device 300. The control unit 308 is coupled to the multiplexer 306 by a control link 308a as well as a data link 308b. As illustrated in FIG. 3, the multiplexer 306 is configured to couple to a storage subsystem, not illustrated, that stores memory subsystem access information that may include volatile memory subsystem access information that is provided by a DIMM image 310a in the illustrated embodiment, non-volatile memory subsystem access information that is provided by an NVDIMM image 310b in the illustrated embodiment, and masking memory subsystem access information that is provided by a blank image 310c in the illustrated embodiment. In an embodiment, each of the DIMM image 310a, the NVDIMM image 310b, and the blank image 310c may be provided on Electrically Erasable Programmable Read-Only Memory (EEPROM) and/or other memory elements included on the storage subsystem in the NVDIMM device 300. While a few examples of memory subsystem access information are illustrated in FIG. 3, one of skill in the art will recognize that some of that memory subsystem access information may be optional and/or may be replaced and/or supplemented with other memory subsystem access information while remaining within the scope of the present disclosure.

An authentication device 312 is provided on the chassis 302 and coupled to the control unit 308 by an I²C link 312a. In some embodiments, the authentication device 312 may provide a Crypto Authentication Device that is configured to verify access keys as discussed below, although other authentication devices will fall within the scope of the present disclosure. A volatile memory subsystem is included on the chassis 302 and, in the illustrated embodiment, is provided by one or more Dynamic Random Access Memory (DRAM) devices 314. One of skill in the art in possession of the present disclosure will recognize that volatile memory subsystems such that the DRAM device(s) 314 are configured to hold information provided on those DRAM device(s) 314 as long as power is provided to those DRAM device(s). A non-volatile memory subsystem is included on the chassis 302 and, in the illustrated embodiment, provided by one or more non-volatile flash (NVflash) memory devices 316. One of skill in the art in possession of the present disclosure will recognize that non-volatile memory subsystems such that the NVflash devices 316 are configured to hold information provided on those NVflash devices 316 regardless of whether power is provided to those NVflash devices 316. While not illustrated, one of skill in the art in possession of the present disclosure will recognize that the volatile memory subsystem and the non-volatile memory subsystem may include other components that provide for conventional power supply, control, instructions and data provisioning, and/or other memory device functionality while remaining within the scope of the present disclosure. In specific embodiments, the DIMM image 310a includes SPD data that may be utilized by the computing device 200 to access the DRAM device(s) 314, and the NVDIMM image 310b includes SPD data that may be utilized by the computing device 200 to access the NVflash device(s) 316.

Figure 4:
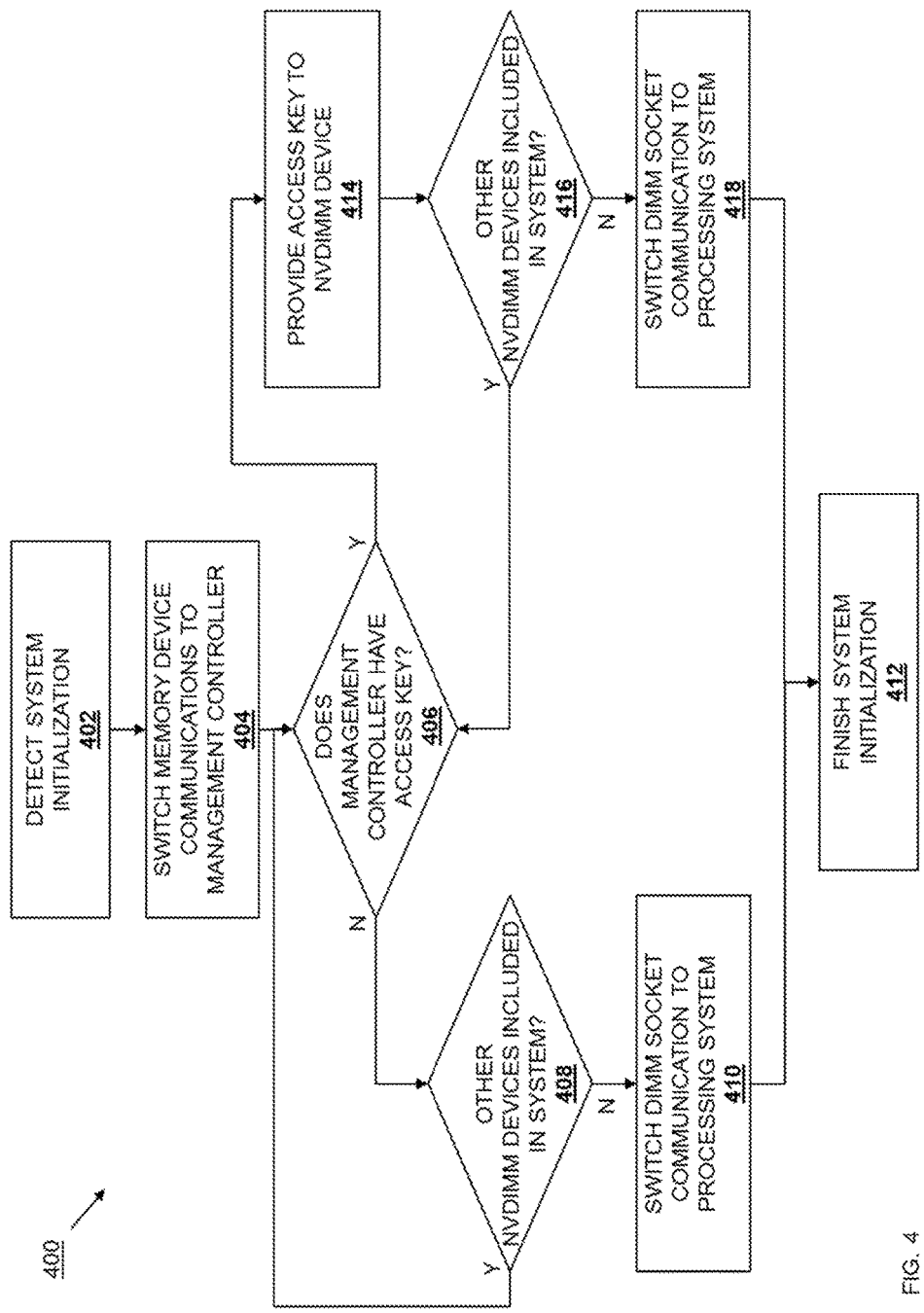
FIG. 4 is a flow chart illustrating an embodiment of a method for providing access to a volatile/non-volatile memory device.
Figure 5:
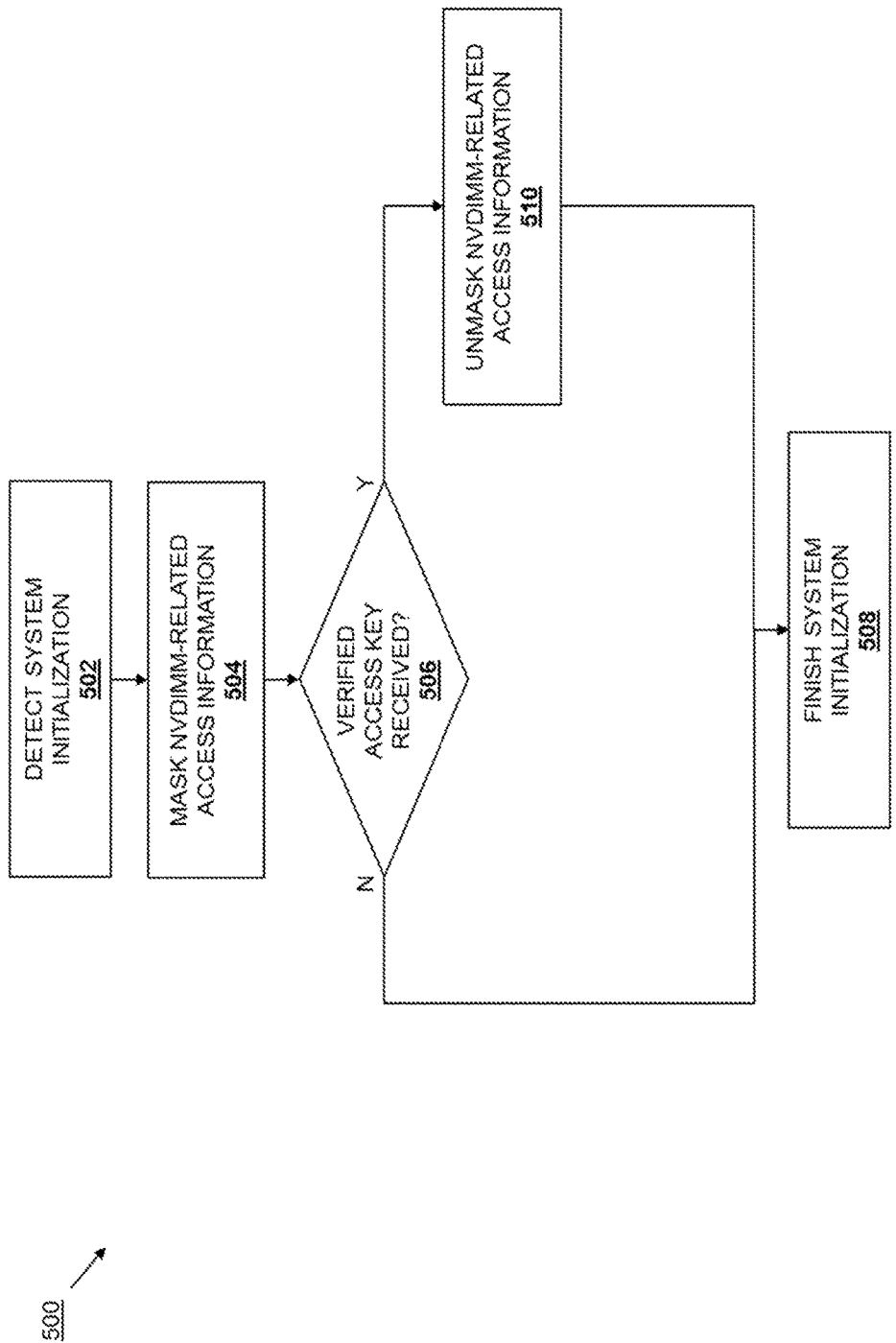
FIG. 5 is a flow chart illustrating an embodiment of a method for providing access to a volatile/non-volatile memory device.

Referring now to FIGS. 4 and 5, an embodiment of methods 400 and 500 for provisioning access to a volatile/non-volatile memory device is illustrated. As discussed below, the systems and methods of the present disclosure operate to provision access to non-volatile memory subsystems in memory devices, which include both those non-volatile memory subsystems as well as volatile memory subsystems, by masking and unmasking non-volatile memory subsystem access information in the memory device such that computing systems that should not have access to the non-volatile memory subsystems are not aware of the non-volatile memory subsystems and thus cannot access instructions and/or data on the non-volatile memory subsystems. For example, as discussed below, if the memory device does not receive and verify a public key from the computing system to which it is coupled, the memory device may overwrite or hide a memory element that includes SPD data that directs the computing system to the non-volatile memory subsystem (or otherwise allows access to the non-volatile memory subsystem), or couple a memory element to the computing system that does not include SPD data that directs or allows access by the computing system to the non-volatile memory subsystem. As such, the computing system will see SPD data that directs the computing system to the volatile memory subsystem (or otherwise allows access to the volatile memory subsystem), and thus will view the memory device as a conventional volatile memory device, while being unable to access the instructions and/or data on the non-volatile memory subsystem. In some embodiments, the masking and unmasking of the non-volatile memory subsystem access information may be utilized by itself to protect the instructions on the non-volatile memory subsystem in the memory device, while in other embodiments the masking and unmasking of the non-volatile memory subsystem access information may be combined with encryption of the instructions and/or data on the non-volatile memory subsystem and/or other isolation strategies in order to provide increasing levels of security for those instructions and/or data.

In the discussions below, the method 400 is discussed as being performed primarily by the management controller 206 in the computing system 200 discussed above with reference to FIG. 2, while the method 500 is discussed as being performed primarily by the NVDIMM device 300 discussed above with reference to FIG. 3. However, one of skill in the art in possession of the present disclosure will recognize that some functionality of the methods 400 and 500 may be performed by other components of the volatile/non-volatile memory device access provisioning system while remaining within the scope of the present disclosure. Furthermore, the discussion below moves back and forth between the methods 400 and 500 in order to illustrate how the methods may be performed concurrently, and one of skill in the art in possession of the present disclosure will recognize that ordering of the method blocks other than what is explicitly discussed herein will fall within the scope of the present disclosure.

Figure 6:
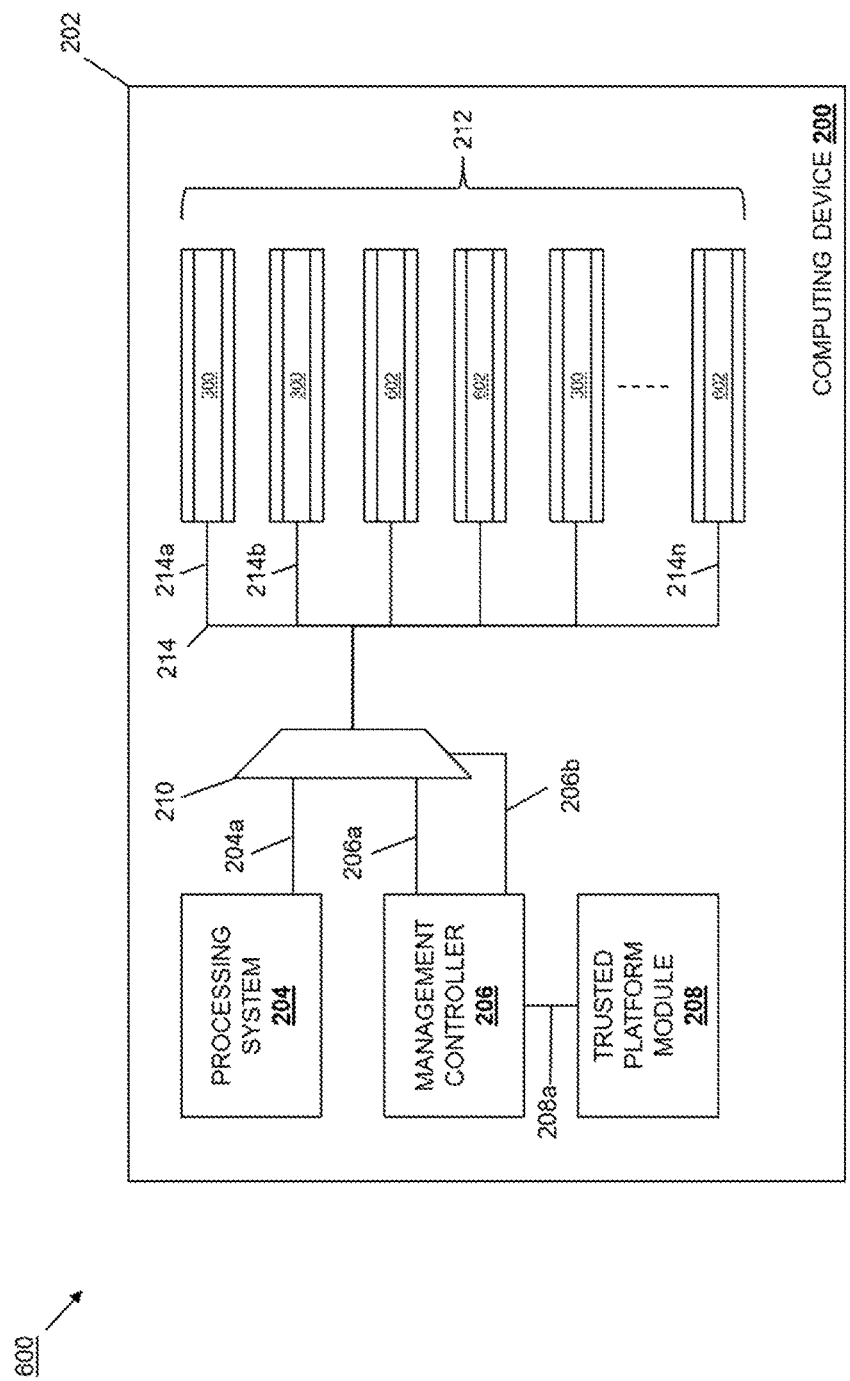
FIG. 6 is a schematic view illustrating an embodiment of a volatile/non-volatile memory device access provisioning system that includes a plurality of the volatile/non-volatile memory devices of FIG. 3 coupled to the computing system of FIG. 2.

The method 400 begins at block 402 where the management controller 206 in the computing device 200 detects system initialization. Similarly, the method 500 begins at block 502 where the control unit 308 in the NVDIMM device 300 detects system initialization. Referring to FIG. 6, an embodiment of a volatile/non-volatile memory device access provisioning system 600 is illustrated in which NVDIMM devices 300 and DIMM devices 602 have been connected to memory system 212. As illustrated, NVDIMM devices 300 have been connected to at least some of the memory device connectors 212a, 212b, and up to 212n, while DIMM devices 602 have been connected to the others of the memory device connectors 212a, 212b, and up to 212n. As discussed above, the NVDIMM devices 300 include both volatile memory subsystems and non-volatile memory subsystems, while the DIMM devices 602 include only volatile memory subsystems (e.g., similar to the DRAM device(s) 314 discussed above in the NVDIMM device 300). While each of the memory device connectors 212a-n are illustrated as coupled to a memory device, one of skill in the art in possession of the present disclosure will recognize that any of memory device connectors 212a-n in the memory system 212 may be left empty (i.e., not connected to a memory device). At blocks 402 and 502, the computing system 200 may be powered on, reset, rebooted, and/or otherwise initialized such that power is provided to the components of the computing device 200 (and the memory devices coupled to the memory system 212 through the memory device connectors 212a-n), and the system initialization is detected by the management controller 206 at block 402 and the control unit 308 at block 502.

Subsequent to the detection of system initialization at block 402, the method 400 proceeds to block 404 where memory device communications are switched from a processing system to the management controller. In an embodiment, upon initialization, the multiplexer 210 is configured to couple the processing system 204 is coupled to the I²C bus 214 such that the processing system 204 may perform memory device communications through the I²C link 204a with memory devices coupled to the memory system 212. At block 404, the management controller 206 may send instructions over the control link 206b to the multiplexer 210 to configured the multiplexer 210 to couple the management controller 206 to the I²C bus 214 such that the management controller 206 may perform memory device communications through the I²C link 206a with memory devices coupled to the memory system 212. However, in some embodiments, upon system initialization, the memory controller 206 may already be configured to perform memory device communications with memory devices coupled to the memory system 212 (e.g., due to the multiplexer 210 being configured to allow such memory device communications, via a dedicated memory device communication channel, etc.), and thus in some embodiments block 404 may be skipped.

Subsequent to the detection of system initialization at block 502, the method 500 proceeds to block 504 where NVDIMM-related access information is masked. In an embodiment, upon initialization, the control unit 308 in the access subsystem 304 of each NVDIMM device 300 may operate to mask the NVDIMM image 310b that, as discussed above, may include SPD data that may be utilized by the computing device 200 to access the NVflash device(s) 316 in the NVDIMM device 300. In one example, at block 502 the control unit 308 may access a memory element that stores the NVDIMM Image 310b and erase, modify, and/or otherwise overwrite the NVDIMM image 310b such that the SPD data that allows access to the NVflash device(s) 316 is no longer present on the memory element and/or is no longer correct such that it no longer provides access to the NVflash device(s) 316. In another example, the control unit 308 may send instructions through the control link 308a to configure the multiplexer 306 such that access is not provided through the multiplexer 306 to the memory element that includes the NVDIMM image 310b (i.e., the control unit 308 may operate to "hide" the NVDIMM image 310b such that it is not presented to the computing device 200). In another example, the control unit 308 may send instructions through the control link 308a to configure the multiplexer 306 such that access in only provided through the multiplexer 306 to memory elements that include the DIMM image 310a and the blank image 310c, and not the NVDIMM image 310b (i.e., the control unit 308 may only connect memory elements to the computing device 200 that do not have SPD data that allows access to the NVflash device(s) 316).

In an embodiment, the masking of the SPD data that allows access to the NVflash device(s) 316 may leave SPD data that allows access the DRAM device(s) 314 in the NVDIMM device 300 (e.g., the DIMM image 310a) available and/or accessible to the computing system 200. As would be understood by one of skill in the art in possession of the present disclosure, without the access to the SPD data provided in the NVDIMM image 310b, the computing system 200 will be unaware of the NVflash device(s) 316 and unable to read or write instructions and/or data from the NVflash device(s) 316. However, with access to the SPD data provided in the DIMM image 310a, the computing system 200 will be aware of the DRAM device(s) 314 and able to read or write instructions and/or data from the DRAM device(s) 314. As discussed below, an NVDIMM device 300 with masked SPD data that allows access to the NVflash device(s) 316, but unmasked SPD data that allows access the DRAM device(s) 314, may subsequently be configured by the processing system 204 in the computing device 200 as a conventional DIMM device (i.e., a DIMM device that includes only volatile memory subsystems such as the DRAM devices 314). While a few examples of masking non-volatile memory subsystem access information in a memory device have been described, one of skill in the art in possession of the present disclosure will recognize that other masking techniques may be utilized that will fall within the scope of the present disclosure.

The method 400 then proceeds to decision block 406 where it is determined whether the management controller has an access key to utilize the non-volatile memory subsystem in an NVDIMM device. In some embodiments discussed below, the ability to utilize non-volatile memory subsystem functionality of the NVDIMM device(s) 300 may require an access key that is provided in a license that a user may purchase from the computing device manufacturer, the NVDIMM device manufacturer, and/or other licensing entities known in the art. For example, the computing system 200 may be purchased by a user with or without the ability to utilize non-volatile memory subsystems in NVDIMM devices, and thus the existence of a license in the computing system 200 may depend on whether the user has previously purchased such a license. However, in other embodiments, the access key to utilize the non-volatile memory subsystem functionality of the NVDIMM device(s) may be associated with authorized users of the computing system 200 and/or the NVDIMM device(s) 300. For example, a user or network administrator may set up security policies for networks, computing devices, and/or NVDIMM devices that define users and/or computing devices that may utilize the non-volatile memory subsystem functionality of the NVDIMM device(s) 300, and access key may be provided in the computing system 200 with the ability to access that access key based on user authentication to the computing system 200.

In an embodiment, a valid access key to utilize the non-volatile memory subsystem in the NVDIMM device(s) 300 may be provided as a public key (which may include a portion of a public key) that is associated with each of the NVDIMM device(s) 300, a public key associated with a plurality of NVDIMM device(s) 300, etc. Such a public key may be created for the NVDIMM devices using a private key generated and/or associated with the NVDIMM device(s) 300 during their manufacture. The public key associated with an NVDIMM device 300 may be stored with the authentication device 312 in the NVDIMM device 300. Furthermore, the public key included in a license that allows the computing device 200 to utilize the non-volatile memory subsystem functionality of an NVDIMM device 300 may be stored in the trusted platform module 208 in the computing device 200. While a specific example of an access key that includes a license and public key is described herein, one of skill in the art in possession of the present disclosure will recognize that other types of access keys may be associated with the NVDIMM devices 300 and provided in the computing device 200 to provide the ability to utilize the non-volatile memory subsystem functionality of the NVDIMM devices 300 while remaining within the scope of the present disclosure.

In an embodiment, at decision block 406, the management controller 206 communicates with an NVDIMM device 300 coupled to the memory system 212 (e.g., via the 120 link 206a, the multiplexer 210, and the I²C bus 214) to identify that NVDIMM device 300. The management controller 206 may then access the trusted platform module 208 via the I²C link 208a to determine whether an access key is stored in the trusted platform module 208 that is associated with that NVDIMM device 300. If, at decision block 406, the management controller determines that no access key is included in the trusted platform module 208 that is associated with that NVDIMM device 300, the method proceeds to decision block 408 where it is determined whether other NVDIMM devices are included in the computing system. In an embodiment, at decision block 408, the management controller 206 communicates via the 120 link 206a, the multiplexer 210, and the I²C bus 214 to identify whether other NVDIMM devices 300 are coupled to the memory system 212. If, at decision block 408, it is determined that other NVDIMM devices are included in the computing system 200, the method 400 returns to decision block 406. If, at decision block 408, it is determine that no other NVDIMM devices are included in the computing system 200, the method 400 proceeds to block 410 where memory device communications are switched from the management controller to the processing system.

In an embodiment, at block 410 the management controller 206 may send instructions over the control link 206b to the multiplexer 210 to configured the multiplexer 210 to couple the processing system 204 to the I²C bus 214 such that the processing system 204 may perform memory device communications through the I²C link 204a with memory devices coupled to the memory system 212. However, in some embodiments, the processing system 204 may already be configured to perform memory device communications with memory devices coupled to the memory system 212 (e.g., via a dedicated memory device communication channel, etc.). With the memory device communications passed to the processing system 204, the processing system 204 may use its memory reference code (MRC) and the SPD data available for each of the NVDIMM device(s) 300 for which an access key was not available (e.g., the DIMM image 310a) in order to configure those NVDIMM device(s) 300 as DIMM devices that do not include non-volatile memory subsystems (e.g., conventional DIMM devices). Following block 410, the method 400 proceeds to block 412 where the system finishes initialization. In an embodiment, at block 412 the computing system 200 may complete initialization (e.g., by completing a boot process and loading an operating system), which may allow for the operation of the computing system 200 using, for example, the processing system 204, the memory system 212, as well as other components in the computing device 200.

If, at decision block 406, the management controller determines that an access key is included in the trusted platform module 208 that is associated with that NVDIMM device 300, the method proceeds to block 414 where that access key is provided to the NVDIMM device 300. In an embodiment, the management controller may access the trusted platform module 208 via the I²C link 208a to retrieve a public key (which may be a portion of a public key) that is associated with the NVDIMM device 300, and write that public key to that NVDIMM device 300 via the I²C link 206a, the multiplexer 210, and the I²C bus 214. However, as discussed above, other access keys are envisioned as falling within the scope of the present disclosure, and thus other methods of access key provision to the NVDIMM device 300 are envisions as falling within the scope of the present disclosure as well. The method 400 may then proceed to decision block 408 where it is determined whether other NVDIMM devices are included in the computing system. In an embodiment, at decision block 416, the management controller 206 communicates via the I²C link 206a, the multiplexer 210, and the I²C bus 214 to identify whether other NVDIMM devices 300 are coupled to the memory system 212. If, at decision block 416, it is determined that other NVDIMM devices are included in the computing system 200, the method 400 returns to decision block 406. If, at decision block 416, it is determine that no other NVDIMM devices are included in the computing system 200, the method 400 proceeds to block 418 where memory device communications are switched from the management controller to the processing system.

In an embodiment, at block 418 the management controller 206 may send instructions over the control link 206b to the multiplexer 210 to configured the multiplexer 210 to couple the processing system 204 to the I²C bus 214 such that the processing system 204 may perform memory device communications through the I²C link 204a with memory devices coupled to the memory system 212. However, in some embodiments, the processing system 204 may already be configured to perform memory device communications with memory devices coupled to the memory system 212 (e.g., via a dedicated memory device communication channel, etc.). With the memory device communications passed to the processing system 204, the processing system 204 may use its memory reference code (MRC) and the SPD data available for each of the NVDIMM device(s) 300 for which an access key was available (e.g., the DIMM image 310a and the NVDIMM image 310b) in order to configure those NVDIMM device(s) 300 as NVDIMM devices that include both volatile and non-volatile memory subsystems. Following block 418, the method 400 proceeds to block 412 where the system finishes initialization as discussed above.

Returning to the method 500, subsequent to the masking of the NVDIMM-related access information at block 504, the method 500 proceeds to decision block 506 where it is determined whether a verified access key has been received. In an embodiment, at decision block 506 the control unit 308 in each NVDIMM device 300 may wait some predetermined amount of time to receive an access key and, if such an access key is received, may operate to verify that access key. In one example, at decision block 506 the control unit 308 in an NVDIMM 300 may determine that an access key has not been received during some time period, and the method 500 may then proceed to block 508 where the system finishes initialization. In an embodiment, at block 508 the computing system 200 may complete initialization (e.g., by completing a boot process and loading an operating system), which may allow for the operation of the computing system 200 using, for example, the processing system 204, the memory system 212, as well as other components in the computing device 200.

In another example, at decision block 506 the control unit 308 in an NVDIMM 300 may determine that an access key has been received and, in response, may operate to verify that access key. In an embodiment, the control unit 506 may receive a public key (which may include a portion of a public key) at decision block 506 and, in response, may access the authentication device 312 to determine whether that received public key corresponds to a public key that is stored in the authentication device 312. If the received public key is not verified (e.g., the received public key does not correspond to the public key in the authentication device 312), the method 500 proceeds to block 508 where the system finishes initialization as discussed above. If the received public key is verified (e.g., the received public key corresponds to the public key in the authentication device 312), the method 500 proceeds to block 510 where the NVDIMM-related access information is unmasked.

In an embodiment, at block 510, the control unit 308 in the access subsystem 304 of the NVDIMM device 300 operates to unmask the NVDIMM image 310b that was masked in block 504. As discussed above, the NVDIMM image 310b may include SPD data that may be utilized by the computing device 200 to access the NVflash device(s)

316 in the NVDIMM device 300. In one example, at block 502 the control unit 308 may access a memory element that previously stored the NVDIMM Image 310b that was erased, and write, modify, and/or provide the NVDIMM image 310b such that it includes SPD data that allows access to the NVflash device(s) 316. In another example, the control unit 308 may send instructions through the control link 308a to configure the multiplexer 306 such that access is provided through the multiplexer 306 to the memory element that includes the NVDIMM image 310b (i.e., the control unit 308 may operate to "unhide" the NVDIMM image 310b that was previously "hidden" such that it is accessible to the computing device 200). In another example, the control unit 308 may send instructions through the control link 308a to configure the multiplexer 306 such that access provided through the multiplexer 306 to the memory element that includes the NVDIMM image 310b (e.g., when access was previously only provided to memory elements that include the DIMM image 310a and the blank image 310c). As would be understood by one of skill in the art in possession of the present disclosure, with access to the SPD data provided in the NVDIMM image 310b, the computing system 200 is aware of the NVflash device(s) 316 and able to read or write instructions and/or data from the NVflash device(s) 316. While a few examples of unmasking non-volatile memory subsystem access information in a memory device have been described, one of skill in the art in possession of the present disclosure will recognize that other unmasking techniques may be utilized that will fall within the scope of the present disclosure. The method 500 then proceeds to block 508 where the system finishes initialization as discussed above.

With reference back to the methods 400 and 500, one of skill in the art in possession of the present disclosure will recognize that the masking and unmasking of the NVDIMM-related access information in the NVDIMM devices based on whether an valid access key is provided by a computing system provides for licensing-based access provision and/or increased security of instructions and/or data that may be stored on the NVDIMM device. As would be understood by one of skill in the art in possession of the present disclosure, SPD data such as that discussed above as included in the NVDIMM image 210b may be used by the computing system 200 to configure the NVDIMM device 300 such that non-volatile memory subsystem functionality is enabled with respect to that NVDIMM device 300, and subsequently the computing system 200 may operate to store instructions and/or data in the DRAM devices 314 of the NVDIMM device 300, and when power is removed from the NVDIMM device 300, the computing system 200 may copy the instructions and/or data that was stored in the DRAM devices 314 to the NVflash devices 316 of the NVDIMM device 300 (e.g., also utilizing power provided from a battery or capacitor as discussed above). Thus, utilizing the volatile/non-volatile memory device access provisioning system of the present disclosure, such non-volatile memory subsystem functionality may be enabled for computing devices that have a purchased license, authorized user, and/or other access key, by unmasking the SPD data that provides access to the NVDIMM devices to enable those computing devices to configure the NVDIMM devices to read and write to the non-volatile memory subsystems in the NVDIMMs, while such non-volatile memory subsystem functionality may be disabled for computing devices that do not have a purchased license, authorized user, and/or other access key by masking the SPD data that identifies and provides access to the non-volatile memory subsystems in the NVDIMM devices to prevent those computing devices from reading and writing (and even recognizing) the NVDIMMs (which may simply be interpreted by the computing system as regular DIMM devices with only volatile memory subsystems when the SPD data in the NVDIMM image 310b has been masked).

Thus, systems and methods have been described that provision access to non-volatile memory subsystems on volatile/non-volatile memory device. Such systems and methods may be used to allow users may purchase licenses in order to enable the persistent storage of instructions and/or data from DRAM devices onto NVflash devices in the event of power removal from an NVDIMM device. Furthermore, such systems and methods may be used to provide additional security for NVDIMM devices by preventing access by an unauthorized computing system to the persistent NVflash devices on an NVDIMM device (which may store sensitive information) in the event the NVDIMM device is stolen from an authorized computing device. Furthermore, such systems and methods may be used to provide additional security for computing devices by having those computing devices prevent access to the persistent NVflash devices on an NVDIMM device (which may store malicious information) in the event an unauthorized NVDIMM device is provided in a computing device and the computing device does not have an access key for that NVDIMM device. As discussed above, the masking and unmasking of the non-volatile memory subsystem access information may be utilized by itself to protect the instructions and/or data on the non-volatile memory subsystem in the memory device, while in other embodiments the masking and unmasking of the non-volatile memory subsystem access information may be combined with encryption of the instructions and/or data on the non-volatile memory subsystem and/or other isolation strategies in order to provide increasing levels of security for those instructions and/or data.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:
1. A volatile/non-volatile memory device access provisioning system, comprising:
    a first memory device connector;
    a processing system that is coupled to the first memory device connector;
    a first memory devise that is coupled to the first memory device connector, wherein the first memory device includes at least one volatile memory subsystem and at least one non-volatile memory subsystem; and
    a controller that is coupled to the first memory device connector and that is configured to:
        detect a first memory device in the first memory device connector;
        determine whether an access key for the first memory device is available; and
        provide, in response to determining that the access key for the first memory device is available, the access key to the first memory device; and cause memory device communications to be passed to the processing system in response to determining that there are no other memory devices coupled to the controller, and wherein the first memory device is configured to:
mask non-volatile memory subsystem access information that is included in the first memory device to prevent the processing system from accessing the at least one non-volatile memory subsystem, wherein the masking of the non-volatile memory subsystem access information prevents the processing system from being aware of the non-volatile memory subsystem;
determine the access key for the first memory device has been received from the controller; and
unmask the non-volatile memory subsystem access information such that the processing system can access the at least one non-volatile memory subsystem subsequent to the memory device communication being passed to the processing system.

2. The system of claim 1, wherein the controller is configured to:
cause memory device communications to be passed from the processing system to the controller in response to detecting system initialization.

3. The system of claim 1, wherein the access key for the first memory device includes a public key.

4. The system of claim 1, wherein the non-volatile memory subsystem access information includes Serial Presence Detect (SPD) access information.

5. The system of claim 1, further comprising:
a second memory device connector coupled to the controller; and
a second memory device that is coupled to the second memory device connector, wherein the second memory device includes at least one volatile memory subsystem and at least one non-volatile memory subsystem, and wherein the controller is configured to:
detect the second memory device in the second memory device connector;
determine an access key for the second memory device is unavailable; and
cause, in response to determining there are no other memory devices coupled to the controller, memory device communications to be passed to the processing system, wherein the second memory device is configured to:
mask non-volatile memory subsystem access information that is included in the second memory device to prevent the processing system from accessing the at least one non-volatile memory subsystem;
determine the access key for the second memory device has not been received from the controller; and
continue to mask the non-volatile memory subsystem access information that is included in the second memory device subsequent to memory device communications being passed to the processing system while providing access to the volatile memory subsystem.

6. The system of claim 1, wherein the masking the non-volatile memory subsystem access information includes at least one of: overwriting the non-volatile memory subsystem access information, hiding a memory element that includes the non-volatile memory subsystem access information, and connecting a memory element to the first memory device connector that does not include the non-volatile memory subsystem access information.

7. The system of claim 1, wherein the non-volatile memory subsystem access information is associated with a purchased license to access the at least one non-volatile memory subsystem.

8. A method for provisioning access to a volatile/non-volatile memory device, comprising:
masking, by a memory device, non-volatile memory subsystem access information that is stored in the memory device in order to prevent a system that is coupled to the memory device via a memory device connector from accessing at least one non-volatile memory subsystem that is included in the memory device, wherein volatile memory subsystem access information that is stored in the memory device allows the system to access at least one volatile memory subsystem that is included in the memory device and wherein the masking of the non-volatile memory subsystems access information prevents the system from being aware of the non-volatile memory subsystem;
detecting, by a controller in the system, the memory device in a memory device connector;
determining, by the controller in the system, the valid access key for the memory device is available;
providing, by the controller in the system in response to determining that the valid access key for the memory device is available, the valid access key to the memory device;
determining, by the memory device, the valid access key has been received from the system;
unmasking, by the memory device, the non-volatile memory subsystem access information such that the system can access the at least one non-volatile memory subsystem in response to determining that the valid access key has been received from the system; and
causing memory device communications to be passed from the controller in the system to at least one processor in the system in response to determining that there are no other memory devices coupled to the controller.

9. The method of claim 8, further comprising:
causing, by the system, memory device communications to be passed from the at least one processor to the controller in response to detecting system initialization.

10. The method of claim 8, wherein determining whether the valid access key has been received from the system includes:
receiving, by the memory device, at least a portion of a public key from the system through the memory device connector; and
verifying, by the memory device, the at least the portion of the public key.

11. The method of claim 8, wherein the non-volatile memory subsystem access information includes Serial Presence Detect (SPD) access information.

12. The method of claim 8, wherein the at least one volatile memory subsystem includes a Dynamic Random Access Memory (DRAM) subsystem, and wherein the at least one non-volatile memory subsystem includes a flash memory subsystem.

13. The method of claim 8, wherein the masking the non-volatile memory subsystem access information includes at least one of: overwriting the non-volatile memory subsystem access information, hiding a memory element that includes the non-volatile memory subsystem access information, and connecting a memory element to the memory device connector that does not include the non-volatile memory subsystem access information.

\* \* \* \* \*

UNITED STATES PATENT AND TRADEMARK OFFICE
CERTIFICATE OF CORRECTION

Page 1 of 1

PATENT NO.        : 10,146,704 B2
APPLICATION NO.   : 15/044871
DATED             : December 4, 2018
INVENTOR(S)       : Jinsaku Masuyama et al.

It is certified that error appears in the above-identified patent and that said Letters Patent is hereby corrected as shown below:

In the Claims

Claim 1, Column 12, Line 55: replace "devise" with --device--

Signed and Sealed this
Thirtieth Day of July, 2019

Andrei Iancu
*Director of the United States Patent and Trademark Office*